United States Patent
Patel et al.

(10) Patent No.: US 10,723,469 B2
(45) Date of Patent: Jul. 28, 2020

(54) SYSTEM AND METHOD FOR DRIVING ELECTRICALLY DRIVING A GAS TURBINE ENGINE VIA A WOUND FIELD SYNCHRONOUS MACHINE ASSISTED BY A PMG

(71) Applicant: Hamilton Sundstrand Corporation, Charlotte, NC (US)

(72) Inventors: Dhaval Patel, Loves Park, IL (US); Andreas C. Koenig, Rockford, IL (US)

(73) Assignee: HAMILTON SUNSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/138,608

(22) Filed: Sep. 21, 2018

(65) Prior Publication Data
US 2020/0094977 A1   Mar. 26, 2020

(51) Int. Cl.
B64D 27/02 (2006.01)
H02K 7/20 (2006.01)
B64D 27/00 (2006.01)

(52) U.S. Cl.
CPC ............ B64D 27/023 (2013.01); H02K 7/20 (2013.01); B64D 2027/005 (2013.01); B64D 2027/026 (2013.01)

(58) Field of Classification Search
CPC ......... H02K 7/20; H02P 9/48; H02P 2101/30; B64D 27/023
USPC ......................................................... 322/46
See application file for complete search history.

(56) References Cited

U.S. PATENT DOCUMENTS

| | | | | |
|---|---|---|---|---|
| 4,625,160 A | * | 11/1986 | Hucker | H02K 3/16 310/115 |
| 4,772,802 A | * | 9/1988 | Glennon | F02N 11/04 290/31 |
| 4,868,406 A | * | 9/1989 | Glennon | F02N 11/04 290/4 R |
| 5,023,537 A | * | 6/1991 | Baits | F02N 11/04 290/4 R |
| 5,561,602 A | * | 10/1996 | Bessler | B60L 3/00 123/41.13 |
| 5,625,276 A | * | 4/1997 | Scott | B23K 9/1062 322/24 |
| 5,929,537 A | | 7/1999 | Glennon | |
| 6,631,080 B2 | | 10/2003 | Trimble et al. | |
| 6,768,278 B2 | | 7/2004 | Xu et al. | |

(Continued)

FOREIGN PATENT DOCUMENTS

| CN | 1199680 A | 11/1998 |
|---|---|---|
| EP | 2001121 B1 | 11/2016 |

(Continued)

OTHER PUBLICATIONS

European Patent Office, Extended European Search Report, Application No. 19198994.6-1202, dated Nov. 18, 2019 (6 pp.).

*Primary Examiner* — Sean Gugger
(74) *Attorney, Agent, or Firm* — Cantor Colburn LLP

(57) ABSTRACT

Disclosed is a system for a gas turbine engine, the gas turbine engine comprising a primary shaft, the system including a rotor shaft; a plurality of components connected to the rotor shaft, including a wound field synchronous main machine (MM) and a permanent magnet generator (PMG); and wherein the PMG, alone or with the MM provide torque to change rotational speed of the rotor shaft, thereby changing rotational speed of the primary shaft.

12 Claims, 2 Drawing Sheets

(56) References Cited

U.S. PATENT DOCUMENTS

| | | |
|---|---|---|
| 6,906,479 B2 | 6/2005 | Xu et al. |
| 7,301,311 B2 | 11/2007 | Xu et al. |
| 7,514,806 B2 | 4/2009 | Xu et al. |
| 7,687,928 B2 * | 3/2010 | Taneja ............. F01D 15/10 290/31 |
| 7,863,868 B2 * | 1/2011 | Xu ................ H02K 19/26 322/44 |
| 8,148,834 B2 | 4/2012 | Huang et al. |
| 2006/0087293 A1 * | 4/2006 | Xu ................ H02K 19/26 322/59 |
| 2007/0194572 A1 * | 8/2007 | Xu ................ H02K 19/12 290/31 |
| 2007/0222220 A1 * | 9/2007 | Huang ............. F02N 11/04 290/31 |
| 2009/0009129 A1 * | 1/2009 | Markunas ........... H02P 9/10 318/702 |
| 2012/0062161 A1 * | 3/2012 | Patel ............... H02P 6/18 318/400.33 |
| 2012/0299515 A1 * | 11/2012 | Markunas ........... H02P 6/20 318/400.11 |
| 2013/0284529 A1 * | 10/2013 | Kral ............. H05K 7/20927 180/68.1 |
| 2014/0045648 A1 | 2/2014 | Bangura et al. |
| 2015/0251741 A1 * | 9/2015 | Cantwell ........... B63H 21/17 701/21 |
| 2015/0345370 A1 * | 12/2015 | Biagini ............. F01P 11/14 105/62.1 |
| 2018/0026568 A1 | 1/2018 | Huang |
| 2018/0034395 A1 | 2/2018 | Huang et al. |
| 2019/0123669 A1 * | 4/2019 | Rocha .............. B64D 41/00 |
| 2019/0214929 A1 * | 7/2019 | Wilkinson ......... F02B 63/042 |

FOREIGN PATENT DOCUMENTS

| | | |
|---|---|---|
| EP | 2911291 B1 | 8/2019 |
| WO | 2016133502 A1 | 8/2016 |

* cited by examiner

SYSTEM AND METHOD FOR DRIVING ELECTRICALLY DRIVING A GAS TURBINE ENGINE VIA A WOUND FIELD SYNCHRONOUS MACHINE ASSISTED BY A PMG

BACKGROUND

Exemplary embodiments pertain to the art of engines and more specifically to a system and method for driving an engine via a main machine assisted by a permanent magnet generator.

BRIEF DESCRIPTION

Disclosed is a system for a gas turbine engine, the gas turbine engine comprising a primary shaft, the system comprising a rotor shaft; a plurality of components connected to the rotor shaft, including a wound field synchronous machine (hereinafter referred to as. a main machine (MM)) and a permanent magnet generator (PMG); and wherein the PMG, alone or with the MM provide torque to change rotational speed of the rotor shaft, thereby changing rotational speed of the primary shaft during engine start or assisting during speed changes of the engine. Once the engine is at a stable speed, the system may be utilized to provide electrical power to the aircraft.

In addition to one or more of the above disclosed features or as an alternate the MM and PMG together provide torque to change rotational speed of the rotor shaft, thereby changing rotational speed of the primary shaft.

In addition to one or more of the above disclosed features or as an alternate the system includes a plurality of controllers controlling current to the plurality of components, including an MM controller and a PMG controller; and a DC bus operationally connected to the plurality of controllers; and wherein when rotationally driving the MM with the PMG: the DC bus provides power to the plurality of controllers; the MM controller provides current to the MM; and the PMG controller provides current to the PMG, whereby the MM and PMG together provide torque to change rotational speed of the rotor shaft.

In addition to one or more of the above disclosed features or as an alternate the plurality of components include an exciter and a rotating rectifier, and wherein when rotationally driving the MM and the PMG: the MM controller provides current to the exciter; the exciter provides excited current to the rotating rectifier; and the rotating rectifier provides power to the MM.

In addition to one or more of the above disclosed features or as an alternate the MM controller and the PMG controller are air-cooled controllers.

In addition to one or more of the above disclosed features or as an alternate the rotor shaft and a primary shaft are an integral shaft and the primary shaft is a fan shaft.

In addition to one or more of the above disclosed features or as an alternate the MM and PMG together provide torque during engine start-up.

In addition to one or more of the above disclosed features or as an alternate the MM and the PMG together provide torque to change rotational speed of the gas turbine engine during climb, cruise, loiter and/or landing.

In addition to one or more of the above disclosed features or as an alternate the PMG provides primary torque to the rotor shaft during engine maintenance.

In addition to one or more of the above disclosed features or as an alternate the PMG provides primary torque to the rotor shaft prior to initial engine startup and/or at engine shutdown, thereby reducing stress on the rotor shaft.

Further disclosed is a method of operating a system for a gas turbine engine, the engine comprising a primary shaft and the system comprising a rotor shaft and a plurality of components including a main machine (MM) and a permanent magnet motor (PMT), the method including utilizing one or more of the above disclosed features to provide torque to the primary shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
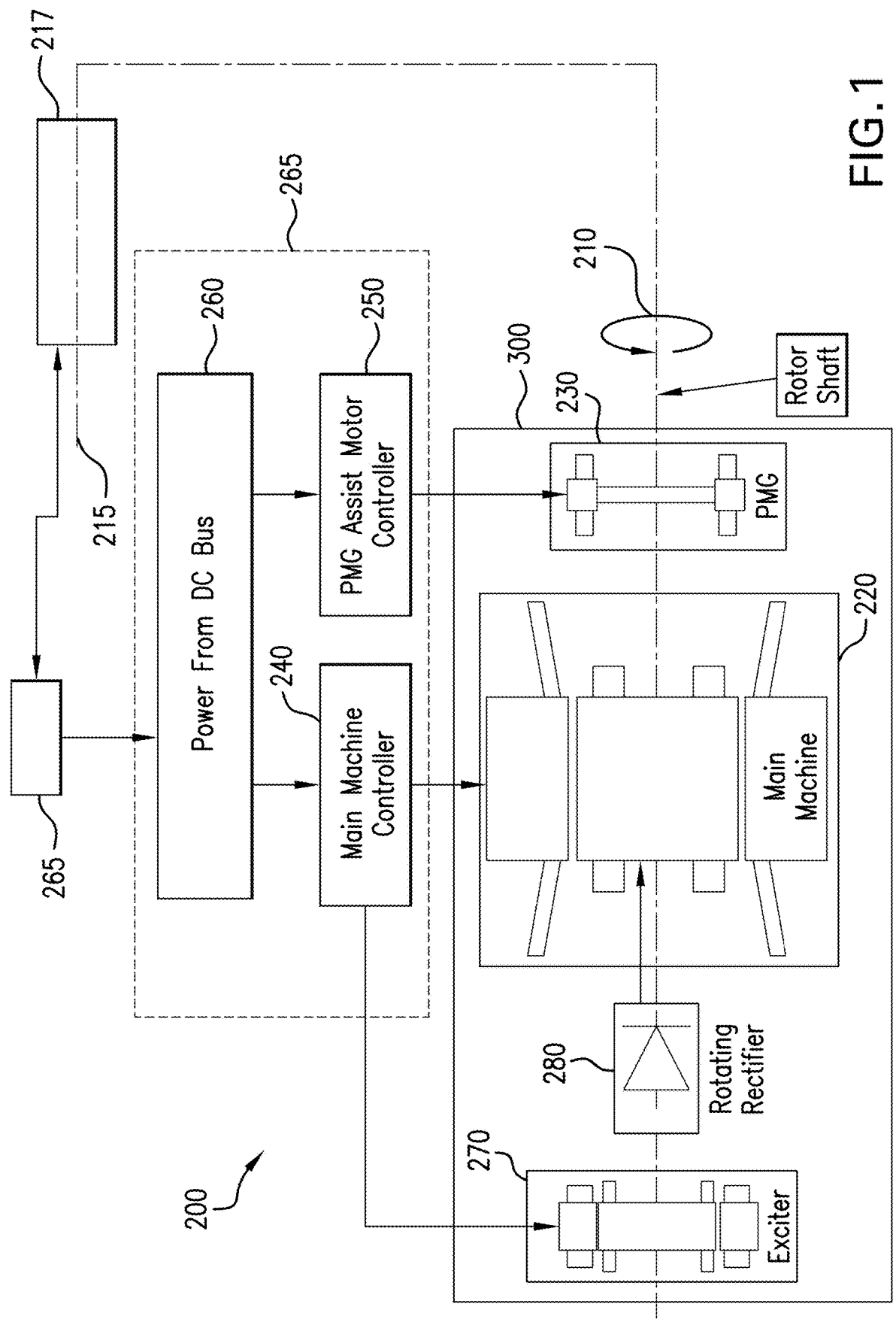
FIG. 1 illustrates a disclosed configuration in which components of an engine are configured during startup of a main machine (MM)

Turning to FIG. 1, disclosed, generally, is an engine system 200 comprising a rotor shaft 210. The system 200 may be used to provide torque to change the speed of a primary shaft 215 of a gas turbine engine 217, illustrated schematically. The primary shaft 215 may be, for example, a fan shaft. The rotor shaft 210 and primary shaft 215 may be an integral shaft. The system 200 may include a plurality of components, including a first component 220 and a second component 230. The plurality of components may be operationally connected to the rotor shaft 210. The first component 220 may be a main machine (MM) as defined above in this document and the second component 230 may be a permanent magnet generator (PMG), sometimes referred to as a PMG assist motor.

In one disclosed embodiment torque changing the speed of the primary shaft 215 of the gas turbine engine 217 may be obtained from a combination of the MM 220 providing primary driving torque and the PMG 230 providing supplemental torque. In one embodiment the PMG 230 provides such supplemental torque during engine startup. In one embodiment the PMG 230, with or without the MM 220, provides such supplemental torque to increase the engine speed during other flight legs, such as climb, cruise, loiter and landing.

More specifically, the system 200 may comprise a plurality of controllers including first controller 240 and a second controller 250. The plurality of controllers may control current to the plurality of components. That is, the first controller 240 may be an MM controller and the second controller 250 may be a PMG assist motor controller. The system 200 may further include a DC bus 260 operationally connected to the plurality of components, where the DC bus 260 is operationally connected to a primary engine controller 265.

Figure 2:
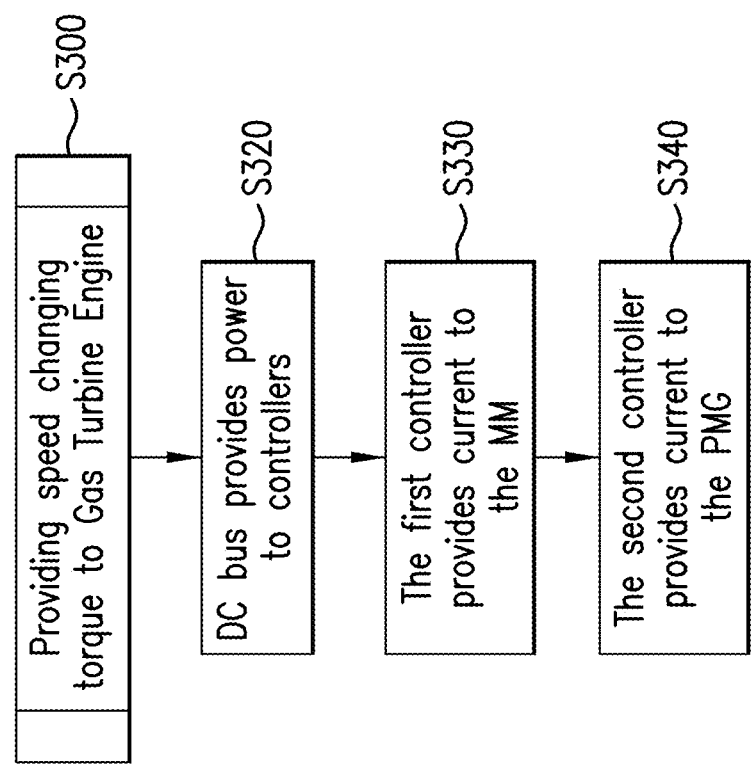
FIG. 2 illustrates a process performed by the components as illustrated in FIG. 1.

Turning to FIG. 2, a process S300 of providing speed changing torque to a gas turbine engine 217 is disclosed. The process may include step S320 the DC bus 260 providing power to the plurality of controllers. At step S330 the first controller 240 may provide current to the MM 220 to provide primary torque to the gas turbine engine 217. At step S340 the second controller 250 may provide current to the PMG 230 to provide supplemental torque to the gas turbine engine 217. From this, speed changing torque may be provide to the gas turbine engine 217.

Figure 3:
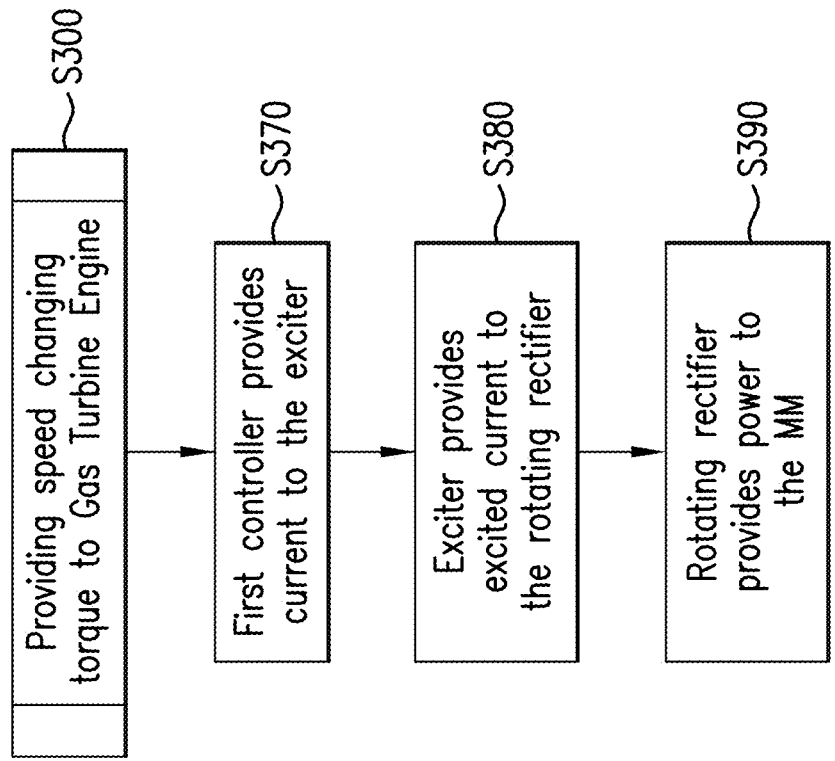
FIG. 3 further illustrates a process performed by the components as illustrated in FIG. 1.

Turning back to FIG. 1, the plurality of components may include an exciter 270 and a rotating rectifier 280. Regarding use of these features and elements, FIG. 3 illustrates that process S300 may also include step S370 of the first controller 240 providing current to the exciter 270. At step S380, the exciter 270 may provide excited current to the rotating rectifier 280. At step S390 the rotating rectifier 280 may provide power to the MM 220 to magnetize the rotating field (i.e. the system forms an electromagnet). It is to be appreciated that in this configuration, where the PMG 230 provides supplemental power to the MM 220, the steps in FIG. 3 occur before the steps in FIG. 2.

As indicated, in one embodiment the shaft 210 may be a fan shaft in a gas turbine engine. As indicated, in one embodiment the PMG 230 may provide supplemental torque during an engine start-up mode, for example, when engine operational speeds are below a self-sustaining mode, when an engine is on-wing of an aircraft but the aircraft is not in flight. Thus a start of a gas turbine engine 217 may be achieved without, for example, bleeding energy from a secondary system such as fuselage mounted auxiliary power unit (APU). Additionally, during an active leg of the aircraft flight, the PMG 230 may be used, with or without the MM 220 depending on torque requirements, to provide torque to the gas turbine engine 217, to increase rotational speed, and thereby obtain additional thrust.

In one embodiment the PMG 230 may rotationally drive the engine 217 during engine maintenance, that is, without the need for primary torque from the MM 220. In one embodiment the PMG 230 may rotationally drive the engine 217 for a time period at engine startup and/or shutdown to prevent bowing of the engine rotor shaft caused by rapid changes in engine temperatures at those transitional engine phases. It is to be appreciated that the plurality of components of the engine are commonly referred to as a generator 300 when used during normal operational speeds. During such conditions the MM 220 may generate power that may be used to power, for example, aircraft systems.

The above disclosure provides a system and method of completing the engine start for the aircraft where required start torque may be greater than that provided by the MM alone. Such method may utilize a permanent magnet generator (PMG) 230 to provide additional torque during start mode. Once the engine 217 has reached a self-sustaining mode, the PMG 230 may be utilized to provide excitation for a generate mode.

Having two motor controllers as illustrated in FIG. 1 may reduce the power output required from the controllers, thus allowing for air cooled motor controllers. A The Main machine controller 240 is illustrated that provides excitation through the exciter 270, which may receive excitation power from the alternating current (AC) aircraft bus 260. In this system 200 the exciter 270 may be a three phase induction exciter. Air framers may be integrating additional PMGs 230 into the generator 300 to power items such as flight controls and hydraulic pumps. These PMGs 230 may be utilized for start assist as well. Once the system is online, it may move back to a generate mode for operating the generator 300. In some cases the PMG Assist Motor Controller (250) can be utilized as a rectifier to source DC (direct current) power to the controller and exciter for generate mode.

For low speed maintenance or motoring conditions that could otherwise lead to a bowed rotor shaft as identified above, the PMG 230 may be operated without the MM 220 allowing for lower power operation without the need of operating the generator excitation system. This may allow for more efficient operation and minimizes thermal stress on the excitation system of an engine main generator.

The disclosed embodiments may have the following benefits: (1) by splitting up the motor controller, the motor controllers may be more effectively air cooled; (2) either controller may be used for other relatively smaller loads like fan applications or hydraulics, which may tend to be smaller loads on narrow body aircraft; (3) electric engine start may occur without oversizing a main generator beyond certain desired limits; (4) using the PMG 230 for motoring during low speed motoring for maintenance or bowed rotor shaft conditions may allow for reducing overall power required; (5) the PMG 230, in some embodiments, may be used as a position sensor; (6) the disclosed system may provide for an elimination of the bleed air system and duct work; and (7) the disclosed system may provide for an elimination of an air turbine starter.

Electric engine start may be a feasible technology for architectures where the engine start power requirements may be lower than power generation requirements. The ratio of start power to power generation requirements may be in or near a range of three to five (3:5). The disclosed architecture may lend itself towards wide body commercial aircraft and military aircraft because the engine start requirements may be a fraction of required power during power generate mode. This may provide a weight reduction opportunity.

Another reason this may be favored for the wide body and military markets may be the higher start power systems for driving liquid cooled starter/motor controllers. The wide body market may be able to support the liquid cooled starter/motor controller because of an available space and an ability to multiplex a controller to support an engine start, as well as air management systems and hydraulic pumps. The disclosed configuration may allow for a common motor controller, resulting in a relatively smaller package. The military market may support liquid cooled systems because the cooling medium may be fuel, which may be heated prior to injection in the engine.

For narrow body commercial aircraft, the engine requirements may be such that the start power may be greater than, for example, engine requirements during the power generating mode. An example of this may be where start power a commercial aircraft is 150 kW and the electrical system power requirements otherwise may be 90 kW. It is to be appreciated by one reading this disclosure that the start power may drive the size of a generator and force liquid cooled motor controllers.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for a gas turbine engine, the gas turbine engine comprising a primary shaft, the system comprising
    a rotor shaft;
    a plurality of components connected to the rotor shaft, including a wound field synchronous main machine (MM) and a permanent magnet generator (PMG); and
    wherein the PMG, alone or with the MM provide torque to change a rotational speed of the rotor shaft, thereby changing a rotational speed of the primary shaft,
    wherein the MM and PMG together provide torque to change the rotational speed of the rotor shaft, thereby changing rotational speed of the primary shaft, and
    wherein the PMG provides primary torque to the rotor shaft during engine maintenance.

2. The system of claim 1 comprising:
    a plurality of controllers controlling current to the plurality of components, including an MM controller and a PMG controller; and
    a DC bus operationally connected to the plurality of controllers; and
    wherein when rotationally driving the MM with the PMG:
    the DC bus provides power to the plurality of controllers;
    the MM controller provides current to the MM; and
    the PMG controller provides current to the PMG, whereby the MM and PMG together provide torque to change the rotational speed of the rotor shaft.

3. The system of claim 2 wherein the plurality of components include an exciter and a rotating rectifier, and wherein when rotationally driving the MM and the PMG:
    the MM controller provides current to the exciter;
    the exciter provides excited current to the rotating rectifier; and
    the rotating rectifier provides power to the MM.

4. The system of claim 3 wherein the MM controller and the PMG controller are air-cooled controllers.

5. The system of claim 1 wherein the MM and PMG together provide torque during engine start-up.

6. The system of claim 1 wherein the PMG provides primary torque to the rotor shaft prior to initial engine startup and/or at engine shutdown, thereby reducing stress on the rotor shaft.

7. A method of operating a system for a gas turbine engine, the gas turbine engine comprising a primary shaft, the system comprising a rotor shaft and a plurality of components connected to the rotor shaft, including a wound field synchronous main machine (MM) and a permanent magnet generator (PMG), the method comprising:
    providing, from the PMG, alone or with the MM, torque to change a rotational speed of the rotor shaft, thereby changing a rotational speed of the primary shaft,
    wherein the MM and PMG together provide torque to change the rotational speed of the rotor shaft, thereby changing rotational speed of the primary shaft, and
    wherein the PMG provides primary torque to the rotor shaft during engine maintenance.

8. The method of claim 7 comprising:
    providing, from a DC bus, power to an MM controller and a PMG controller,
    providing, from the MM controller, current to the MM; and
    providing, from the PMG controller, current to the PMG, whereby the MM and PMG together provide torque to change the rotational speed of the rotor shaft.

9. The method of claim 8 comprising:
    providing, from the MM controller, current to an exciter;
    providing, from the exciter, excited current to a rotating rectifier; and
    providing, from the rotating rectifier, power to the MM.

10. The method of claim 9 wherein the MM controller and the PMG controller are air-cooled controllers.

11. The method of claim 7 wherein the MM and PMG together provide torque during engine start-up.

12. The method of claim 7 wherein the PMG provides primary torque to the rotor shaft prior to initial engine startup and/or at engine shutdown, thereby reducing stress on the rotor shaft.

* * * * *